United States Patent [19]

Anderson et al.

[11] Patent Number: 4,938,064

[45] Date of Patent: Jul. 3, 1990

[54] ELECTRONIC BOBWEIGHT ELIMINATOR

[75] Inventors: Ronald W. Anderson, Ann Arbor; Leonard J. Salenbien, Saline; Gordon E. Hines, Ann Arbor, all of Mich.

[73] Assignee: Hines Industries, Inc., Ann Arbor, Mich.

[21] Appl. No.: 340,144

[22] Filed: Apr. 17, 1989

[51] Int. Cl.$^5$ ............................................. G01M 1/16
[52] U.S. Cl. ...................................... 73/462; 29/901
[58] Field of Search ................ 73/460, 461, 462, 463, 73/464, 465, 466, 467, 468, 469, 470; 29/901

[56] References Cited

U.S. PATENT DOCUMENTS 3,777,340  12/1973  Langlois ........................... 29/901 X
3,871,234   3/1975  Langlois ................................ 73/460

*Primary Examiner*—Jerry W. Myracle
*Attorney, Agent, or Firm*—Emch, Schaffer, Schaub & Porcello Co.

[57] ABSTRACT

The present invention provides for a method of generating an electronic bobweight signal used to offset an unbalanced signal before the unbalance signal is received at the input portion of the electronic circuitry of the unbalance detection system. The electronic bobweight signal and unbalance signal are matched in their phase angle and are each sampled a specified number of equally spaced times per revolution of the workpiece to provide accurate bobweighted unbalance data without the need for use of physical bobweights and their inherent disadvantages.

5 Claims, 2 Drawing Sheets

ELECTRONIC BOBWEIGHT ELIMINATOR

BACKGROUND OF THE INVENTION

Many workpieces are designed to operate in a dynamically balanced rotational condition carrying attached bodies or tools having a specific mass. Therefore, when the workpiece is disattached from the bodies or tools it will have a certain inherent rotational unbalance. The present invention provides an improved method for offsetting this inherent rotational unbalance of a workpiece in order to accurately complete a dynamic balancing study of the same workpiece. Such balancing studies are in order, for instance, when the workpiece is first manufactured or when it is being altered for some after-market design. These offsetting methods during dynamic balancing studies are traditionally called "bobweighting" and have specifically been applied to the balancing of workpieces such as flywheels and crankshafts which have a plurality of offset throws. For the purposes of illustration and simplicity the method of the present invention will be described as applied to crankshaft balancing. The method, however, is applicable to all balancing operations which require some form of bobweighting and the present description is not intended to be limited solely to use with crankshafts.

A crankshaft is designed to operate a rotationally balanced condition while carrying a plurality of pistons, each having a specific mass. Any attempt to dynamically balance the individual crankshaft must account for the unbalance created by the missing mass of each piston which would normally be fixed to the various throws. A traditional method of providing the necessary duplication of mass is to counterweight or bobweight the workpiece or crankshaft. The bobweights must be accurately constructed and individually attached to each throw of the crankshaft to ensure the accurate duplication of running conditions. While this methodology is proven to be acceptable and accurate in duplicating crankshaft running conditions, the use of such bobweights creates an undesirable complexity in the balancing operation due to the manpower and time consumption needed to properly attach and remove each physical bobweight.

Recent attempts to improve upon the traditional method of bobweighting have focused on electronically offsetting the measured balance reading received from the rotating workpiece. These attempts to electronically offset the bobweight unbalance usually rely either upon a measurement of unbalance from a master part previously balanced with bobweights or master data relating to proper bobweighting provided by the manufacturer. The value of the bobweight unbalance measurement is then used to reduce subsequent unbalance readings taken on subsequent similar parts. Problems have been encountered, however, with such an electronic unbalance offset due to inefficiencies in the electrical circuitry of the components used to analyze the electronic signals and modify the electronic readings of unbalance. It has been found that there is a drift error in the amount and phase angle of the unbalance vector signals from cold startup of the electronic components until the temperature of the components has stablized. this drift error usually amounts to a 2 to 3% change in the amount and phase of the unbalance vector. A 2 to 3% drift error is completely undesirable for a situation where it is necessary to balance a workpiece to fine tolerances. For instance, if it is desired to balance a workpiece to 15 ounce inches of unbalance with a tolerance of plus or minus 0.25, the 2 to 3% drift in the electronics is the equivalent of the tolerance for the balance.

Therefore, a need remains for an improved bobweight system which eliminates the need for use of physical bobweights and yet overcomes the problems encountered by the current electronic bobweight unbalance elimination systems.

SUMMARY OF THE INVENTION

The present invention provides a method for generating an electronic bobweight signal to offset an unbalance signal received at the input portion of the electronic components of an unbalance measuring device before the unbalance signal reaches the portion of the electronic circuitry that causes signal drift due to temperature changes. The present invention uses a precision voltage reference and a digital analog converter to synthesize the electronic bobweight signal to be mixed with the unbalance signal received from the vibration pickup positioned on the workpiece. The resulting unbalance reading is then indicative of the actual unbalance of the workpiece with the bobweight unbalance having been compensated for prior to signal exposure to any potential temperature drift.

DESCRIPTION OF THE PREFERRED EMBODIMENT

The present invention provides for an electronic bobweight counterbalance system which generates a predetermined bobweight signal which is used to cancel or offset the unbalance signal received, during the dynamical balancing of a workpiece, at the input of the analog amplifier.

The bobweight signal is generated by one of two methods. The signal can be obtained by measuring the unbalance of a master part which had been previously balanced using bobweights. The unbalance of the master part when rotated without bobweights accurately portrays the bobweight unbalance of the workpiece. Also, the bobweight unbalance may be obtained from master data for a specific workpiece as supplied by the manufacturer. This bobweight unbalance data is programmed into the computer for a given style or shape of workpiece. Once the computer is calibrated by data obtained from either the master part or the manufacturer, the bobweight unbalance signal is used to oppose the total workpiece unbalance signal which is received from vibration pickups when measuring subsequent similar workpieces.

The bobweight signal is retained in the computer from the data generated by the master part or master data received from the manufacturer. The bobweight signal, when viewed electronically is in the general form of a sine curve or table because any unbalance signal of a rotating workpiece, if seen without disturbing noise, would appear as a sinewave as the result of the vibration pickup viewing the projection of any unbalance vector in one plane, the plane of the sensitivity of the pickup. Therefore, the unbalance signal is shown to be a sine function of the angular position of the unbalance vector.

When balancing a workpiece, each measurement of unbalance received from the vibration pick-up must correlate with and be offset by a bobweight signal. The position of the bobweight signal on the sine curve is timed to the exact position of the rotating workpiece during each measurement of unbalance. An unbalance measurement of a rotating workpiece is typically taken 32 times per revolution of the workpiece on equally spaced intervals. While 32 samples have been typically used per revolution, any number of samples, such as 16 or 64, will suffice depending on the tolerances for accuracy. An even binary number is preferable due to the convenience in calculations since division by an even binary number can be easily accomplished.

The timing of the incoming unbalance signal with the bobweight signal generated by the computer is critical. The two signals must start at the same vector phase angle and the sampling distribution of the rotating workpiece must accurately mate with the sampling distribution of the sine curve for the bobweight signal retained in the memory of the computer. The present invention uses a one pulse per revolution synchronizing signal derived from a mark on the part or an encoder that is synchronized with the part.

Figure 2:
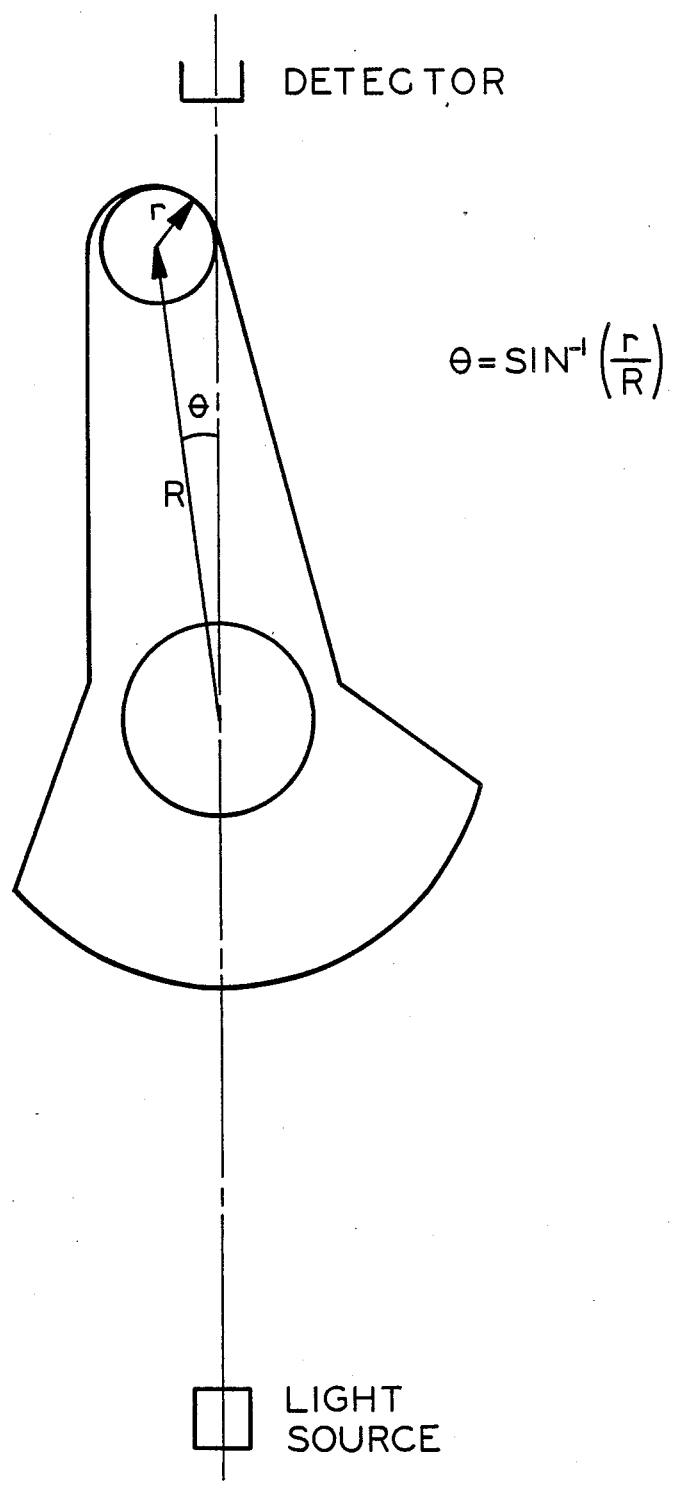
FIG. 2 is a schematic diagram of an end view of a crankshaft passing through a light source and detector used for measuring the phase angles of the electronic unbalance signal produced by the counterbalance sytem of the present invention.

Knowledge of the precise phase angle of an incoming unbalance signal is essential to achieving an accurate correlation with the bobweight unbalance data retained in the computer. An error of 0.6° in the applied bobweight signal will introduce a 1% error in the bobweight vector. Therefore, it is essential to sense the position of the crankshaft or workpiece within fractions of a degree as it is rotating. Referring to FIG. 2, the geometry of the problem regarding the accurate achievement of knowledge of the phase angle is diagrammed. Using a light source such as a laser and a photodetector which triggers as the pin A of the crankshaft passes the centerline of the crank B provides a starting point for accurate signal correlation with the bobweight unbalance data contained in the computer. As indicated in FIG. 2, the light beam will be broken at the point where the angle from the axis of the light beam which has been adjusted to be the vertical centerline of the crankshaft B when the angular position of the pin A satisfies the relationship specified by the formula, $\theta = \arcsin(r/R)$ where r is the radius of the pin A and R is the "throw" distance or the radius at which the center of the pin A rotates with respect to the center of the main bearing or the geometric center of the crank B. The pin A will break the light beam twice per revolution. If the beam is broken as the edge of the pin A passes the centerline of the crank B, and the crank B is running at constant speed, the two points in the revolution where the beam is broken should be exactly equally spaced in time regardless of pin diameter. Thus, the detector can be properly adjusted to affect the timing between the equally spaced signals being received by the vibration pickup and the equally spaced correlating signals being supplied by the computer from the bobweight sine curve data base.

Figure 1:
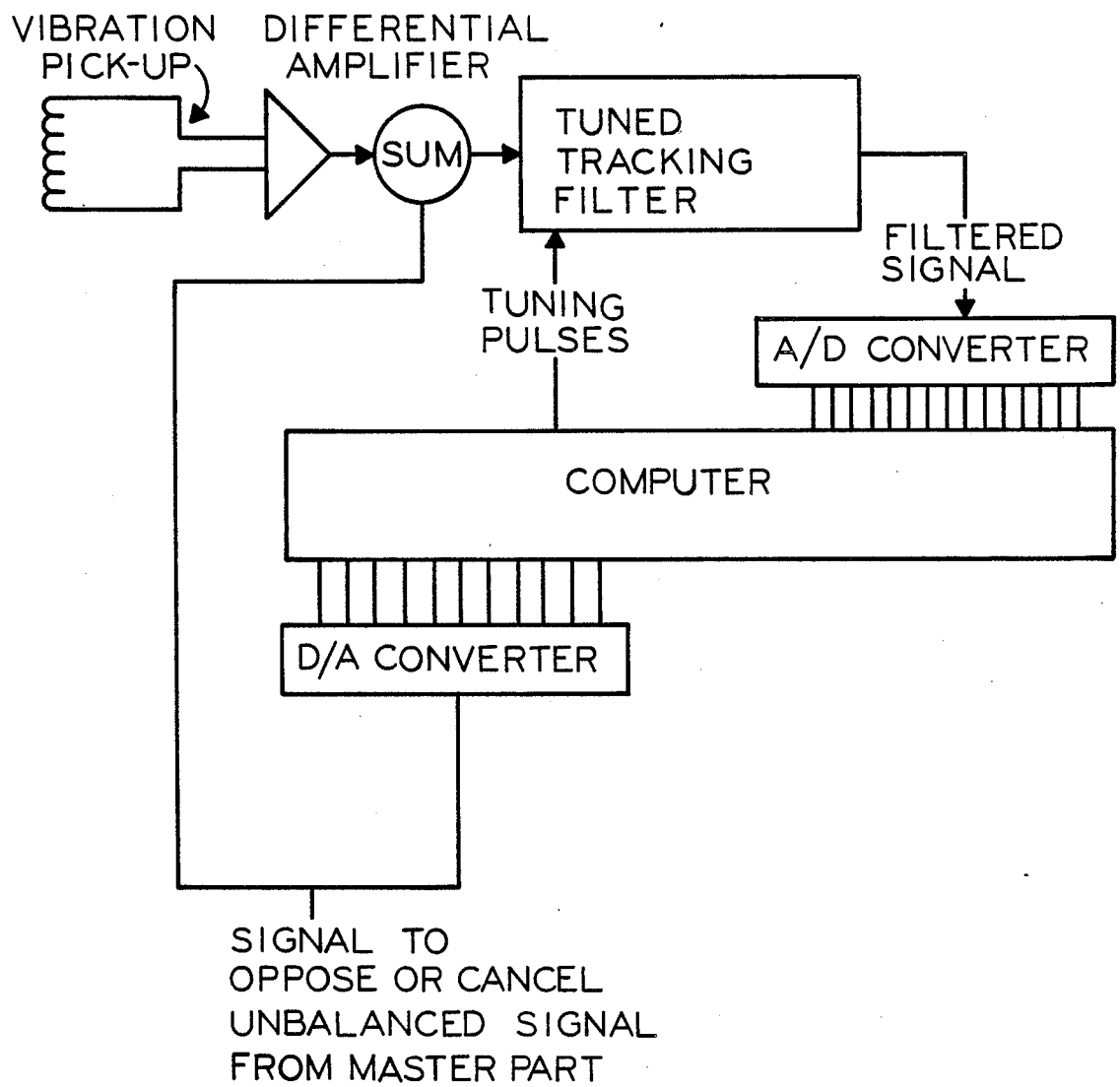
FIG. 1 is a block diagram showing the circuit for the electronic bobweight counterbalance system of the present invention.

Referring now to FIG. 1, the computer will select the equally spaced values from the sine table of bobweight data and output it through the digital to analog converter to mix with the incoming unbalance signal being received from the vibration pickup. The starting point of the sine table is referenced to the synchronizing mark on the workpiece.

The sine table containing the bobweight unbalance data contains values that exercise the full scale of the digital to analog converter. The values from the sine table are multiplied by the predetermined calibration factor scaled to a number between 0 and 1 to determine the digital value actually applied to the digital to analog converter. A binary search method may then be used to vary either the gain factor or the starting point in the sine table in such a manner as to minimize the unbalance signal. Essentially the system will do a binary search for the proper gain and phase (starting point in the sine table) to minimize the differences between the bobweight signal and the incoming unbalance signal. Alternatively, the unbalance of the workpiece may be obtained with the bobweight signal turned off. Then, turning the bobweight signal on with a known calibration factor of, for example, 0.5 and a known phase offset of 0.0, the unbalance can be measured again. The first reading is then subtracted vectorally from the second reading to provide the effect of a calibration factor of 0.5 and a 0.0 phase offset. The required calibration and phase angle is then calculated to cancel the unbalance signal measured on the first spin. This alternative method provides a good first guess at the unbalance values and a limited binary search can then be used to trim the unbalance values to the very best limits.

The sine table values are scaled so that the maximum value is the maximum input to the digital to analog converter. That is, for a ten bit maximum input to the digital to analog converter, the bobweight signal can range over the values −512 to +511 without over ranging the input of the digital to analog converter. The sine table is then scaled with 256 values so that the values are calculated by the formula, (value) $n = 512 = \sin(n/256 \times 2 \times PI)$. The sine function computes the sine of the angle in radians. The table of 256 values for n=0 to n=255 yields the scaled values for 255 equally spaced angles starting at zero. The values are then divided by the number of times the workpiece is sampled per revolution. For instance if a 32 times per revolution sample, every eighth value in the table would be sampled with the table index set to the calculating starting offset each time the part synchronizing mark occurs.

It is contemplated that the present invention will provide the bobweight circuit for two plane balancing as well as one plane balancing. In two plane balancing, each vibration pick-up includes a bobweight circuit as described above and the controller will search for the best values on both channels simultaneously.

The resolution of the digital analog converter is roughly 0.4% of its full scale. Thus, taking into account other considerations, the worst case matching of the two signals is about 1% error. The 1% residual error signal is compensated for by measuring it and digitally subtracting it from subsequent readings. Thus, if the gain of the amplifier changes by 5%, the change in reading is only 5% of the 1% residual error or 0.05% or 0.0075 ounce inches.

The above description of the preferred embodiment is intended to be illustrative of the invention and is not intended to be limiting upon the scope and content of the following claims.

We claim:

1. A method for rotationally balancing a workpiece, the end use of which is to carry attached bodies of a specified mass in a balanced rotational operation, comprising the steps of:

positioning such workpiece without such attached bodies for rotation;

rotating such workpiece to induce a rotational vibration of such workpiece;

monitoring said rotational vibration of such workpiece and generating an electronic signal representative of said vibration;

processing such electronic signal to determine the amount and location of such rotational unbalance;

generating a second electronic signal representative of any unbalance created by the removal of such attached bodies from such workpiece; and, applying said second electronic signal to said first electronic signal to offset said first electronic signal by the amount of unbalance created by such removed bodies, whereby the amount of unbalance signal remaining is solely representative of the inherent rotational unbalance of the workpiece as if such workpiece were operating with such bodies attached, said second electronic signal being applied to said first electronic signal prior to said first electronic signal being processed to determine the amount and location of such rotational unbalance.

2. The method of claim 1, wherein said second electronic signal is generated by measuring the unbalance of a master workpiece without attached bodies, said master workpiece being of the same configuration as such workpiece, wherein said master workpiece had been previously balanced to operate in a rotationally balanced manner with said attached bodies.

3. The method of claim 1, wherein said second electronic signal is generated from master data supplied by the manufacturer of such workpiece.

4. The method of claim 1, wherein said first and second signals are timed to correlate at identical phase angles for any selected point in the rotation of such workpiece.

5. The method of claim 1, wherein such electronic signal is sampled at thirty-two equally spaced intervals per one revolution of such workpiece and said second electronic signal is sampled at thirty-two equally spaced identical intervals per revolution of such workpiece.

* * * * *